United States Patent
Derbeko et al.

(10) Patent No.: US 8,990,615 B1
(45) Date of Patent: Mar. 24, 2015

(54) SYSTEM AND METHOD FOR CACHE MANAGEMENT

(71) Applicant: EMC Corporation, Hopkinton, MA (US)

(72) Inventors: Philip Derbeko, Modiin (IL); Zvi Gabriel Benhanokh, Tel Aviv (IL); Anat Eyal, Tel Aviv (IL); Arieh Don, Newton, MA (US); Alex Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 244 days.

(21) Appl. No.: 13/630,214

(22) Filed: Sep. 28, 2012

(51) Int. Cl.
*G06F 11/00* (2006.01)

(52) U.S. Cl.
USPC ............................. 714/6.3; 714/6.1; 714/6.32

(58) Field of Classification Search
USPC .......................................... 714/6.1, 6.3, 6.32
See application file for complete search history.

(56) References Cited

U.S. PATENT DOCUMENTS

| | | | | |
|---|---|---|---|---|
| 6,467,048 B1* | 10/2002 | Olarig et al. | ................. | 714/6.32 |
| 6,658,542 B2* | 12/2003 | Beardsley et al. | ............ | 711/162 |
| 6,970,972 B2* | 11/2005 | Hosoya | ......................... | 711/113 |
| 7,051,174 B2* | 5/2006 | Ash et al. | ...................... | 711/162 |
| 7,395,452 B2* | 7/2008 | Nicholson et al. | .............. | 714/22 |
| 7,600,087 B2* | 10/2009 | Yamagami | ..................... | 711/162 |
| 8,694,826 B2* | 4/2014 | Myrah et al. | ................... | 714/6.3 |
| 8,775,867 B2* | 7/2014 | Blinick et al. | ............... | 714/6.21 |
| 8,782,464 B2* | 7/2014 | Blinick et al. | ............... | 714/6.21 |
| 2011/0004785 A1* | 1/2011 | Takada et al. | ..................... | 714/5 |

* cited by examiner

*Primary Examiner* — Joshua P Lottich
(74) *Attorney, Agent, or Firm* — Brian J. Colandreo; Mark H. Whittenberger; Holland & Knight LLP (57) ABSTRACT

A method, computer program product, and computing system for receiving an indication that a hard disk drive within a data array is failing, thus defining a failing hard disk drive. At least a portion of the data included within the failing hard disk drive is copied to a failover portion of a front end cache system included within a host coupled to the data array, thus defining a backup data set.

21 Claims, 5 Drawing Sheets

SYSTEM AND METHOD FOR CACHE MANAGEMENT

TECHNICAL FIELD

This disclosure relates to cache systems and, more particularly, to systems and methods for cache management.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes receiving an indication that a hard disk drive within a data array is failing, thus defining a failing hard disk drive. At least a portion of the data included within the failing hard disk drive is copied to a failover portion of a front end cache system included within a host coupled to the data array, thus defining a backup data set.

One or more of the following features may be included. The failover portion of the front end cache system may be defined in response to receiving the indication that the hard disk drive within the data array is failing. Defining the failover portion of the front end cache system may include flushing any cache data currently residing in the failover portion of the front end cache system. The front end cache system may be a flash-based front end cache system. The at least a portion of the data included within the failing hard disk drive may include at least a portion of one or more LUNs. An indication that the failing hard disk drive has been replaced may be received, thus defining a replacement hard disk drive. At least a portion of the backup data set may be restored onto the replacement hard disk drive.

In another implementation, a computer program product resides on a computer readable medium that has a plurality of instructions stored on it. When executed by a processor, the instructions cause the processor to perform operations including receiving an indication that a hard disk drive within a data array is failing, thus defining a failing hard disk drive. At least a portion of the data included within the failing hard disk drive is copied to a failover portion of a front end cache system included within a host coupled to the data array, thus defining a backup data set.

One or more of the following features may be included. The failover portion of the front end cache system may be defined in response to receiving the indication that the hard disk drive within the data array is failing. Defining the failover portion of the front end cache system may include flushing any cache data currently residing in the failover portion of the front end cache system. The front end cache system may be a flash-based front end cache system. The at least a portion of the data included within the failing hard disk drive may include at least a portion of one or more LUNs. An indication that the failing hard disk drive has been replaced may be received, thus defining a replacement hard disk drive. At least a portion of the backup data set may be restored onto the replacement hard disk drive.

In another implementation, a computing system includes at least one processor and at least one memory architecture coupled with the at least one processor, wherein the computing system is configured to perform operations including receiving an indication that a hard disk drive within a data array is failing, thus defining a failing hard disk drive. At least a portion of the data included within the failing hard disk drive is copied to a failover portion of a front end cache system included within a host coupled to the data array, thus defining a backup data set.

One or more of the following features may be included. The failover portion of the front end cache system may be defined in response to receiving the indication that the hard disk drive within the data array is failing. Defining the failover portion of the front end cache system may include flushing any cache data currently residing in the failover portion of the front end cache system. The front end cache system may be a flash-based front end cache system. The at least a portion of the data included within the failing hard disk drive may include at least a portion of one or more LUNs. An indication that the failing hard disk drive has been replaced may be received, thus defining a replacement hard disk drive. At least a portion of the backup data set may be restored onto the replacement hard disk drive.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
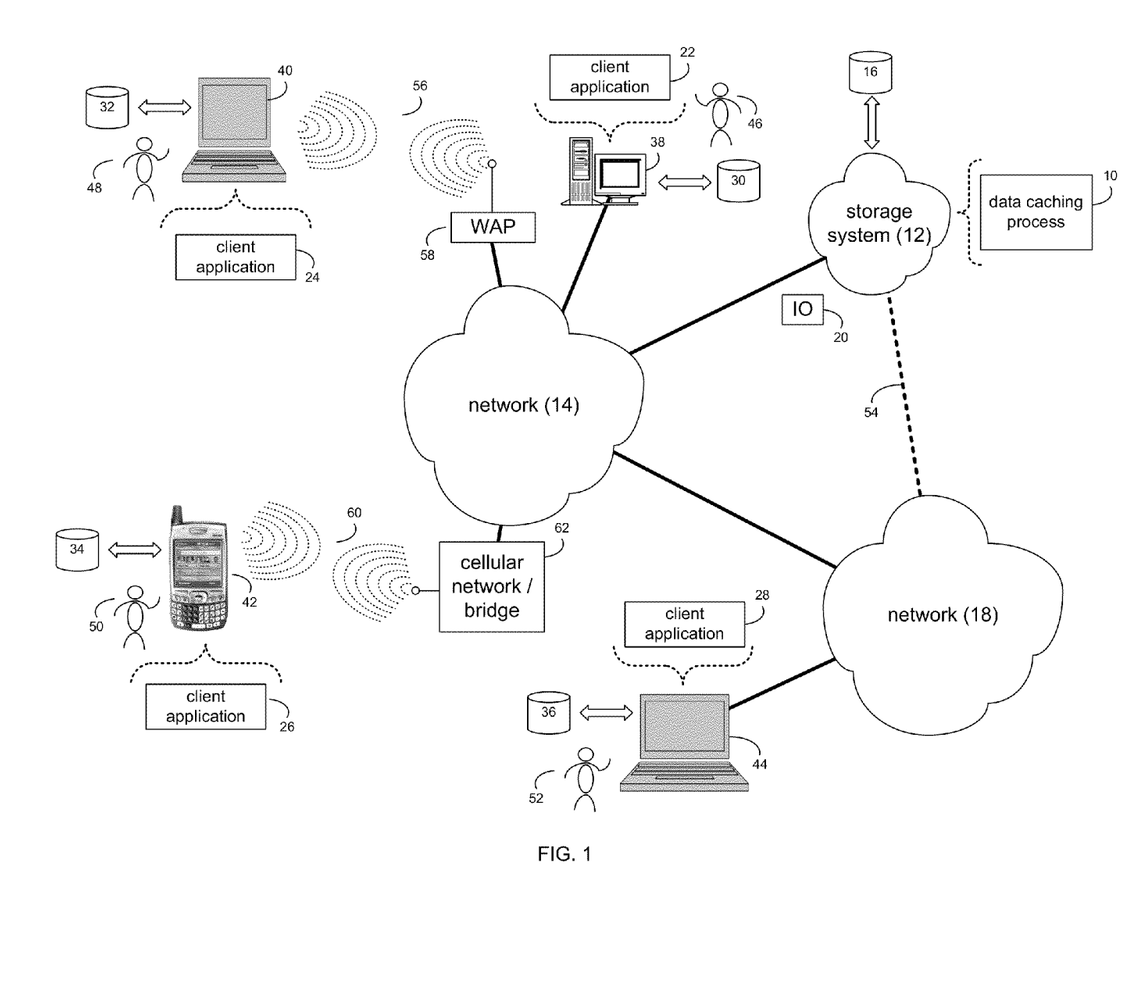
FIG. 1 is a diagrammatic view of a storage system and a cache management process coupled to a distributed computing network.

System Overview:

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™ Redhat Linux™, Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
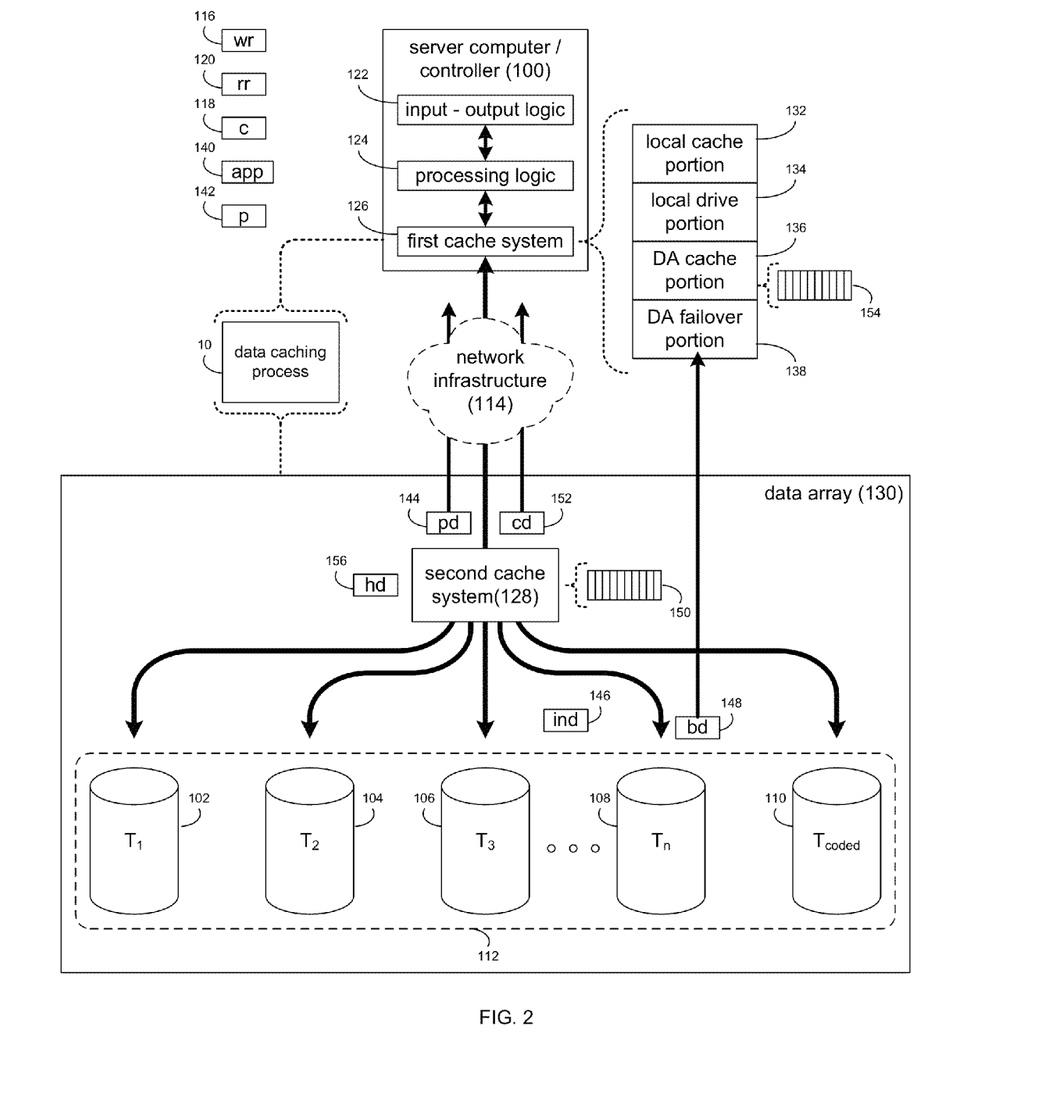
FIG. 2 is a diagrammatic view of the storage system of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electromechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of cache management process 10 may be executed by one or more processors (not shown) and one or more memory architectures (not shown) included within data array 130.

The Cache Management Process:

As discussed above, server computer/controller 100 may include first cache system 126, wherein processing logic 124 may initially store content 118 within first cache system 126. Depending on the manner in which first cache system 126 is configured, processing logic 124 may immediately write content 118 included in a write request to data array 130 (if first cache system 126 is configured as a write-through cache) or may subsequently write content 118 included in a write request to data array 130 (if first cache system 126 is configured as a write-back cache). Further, content (e.g., content 118) retrieved from data array 130 in response to a read request may be written to first cache system 126. For illustrative purposes, assume that first cache system 126 is configured as a write-through cache.

First cache system 126 may be compartmentalized into a plurality of portions that each may be configured to perform a different task. For example, first cache system 126 may include local IO portion 132 that may be configured to temporarily store content 118 in the manner described above (e.g., in response to write requests providing content 118 to server computer/controller 100 and/or in response to read requests asking for content 118 from server computer/controller 100). First cache system 126 may further include local drive portion 134. Local drive portion 134 may be configured as usable storage space by one or more applications being executed on server computer/controller 100. For example, if server computer/controller 100 is executing a database application and that database application uses a swap file, that swap file may be stored within local drive portion 134 of first cache system 126. First cache system 126 may additionally include data array cache portion 136 and data array failover portion 138, the functionality of which will be discussed below in greater detail.

As discussed above, server computer/controller 100 may be configured as an application server. Accordingly, server computer/controller 100 may execute one or more applications (e.g., application 140). An example of application 140 may include a database application (such as Oracle™), wherein the various associated database files (e.g., database record files, temporary files, index files, and log files) may be stored on data array 130.

Figure 3:
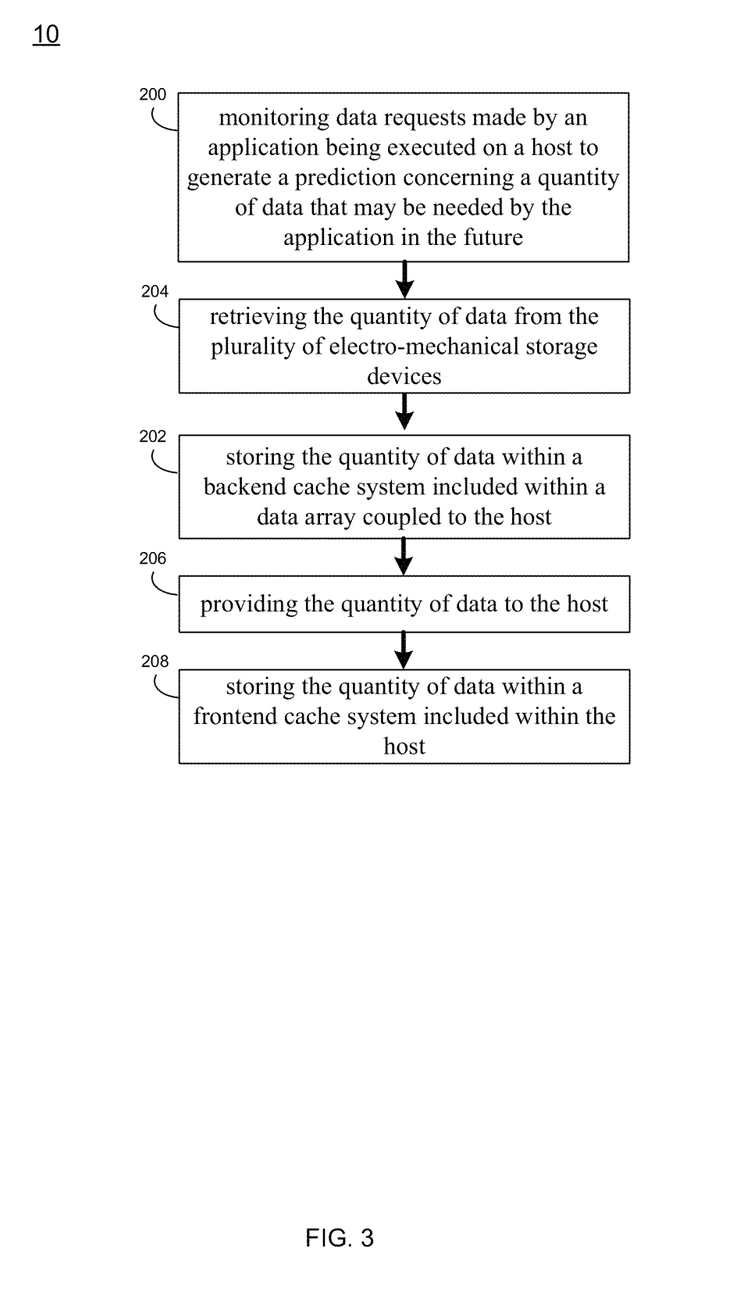
FIG. 3 is a flow chart of one implementation of the cache management process of FIG. 1.

Referring also to FIG. 3, cache management process 10 may monitor 200 data requests made by an application (e.g. application 140) being executed on a host (e.g., server computer/controller 100) to generate a prediction (e.g., prediction 142) concerning a quantity of data that may be needed/requested by application 140 in the future. For example, cache management process 10 may monitor 200 the way that application 140 is performing to predict the quantity of data that application 140 may need/request in the near future so that it may be prefetched in anticipation of being needed/requested. Accordingly, assume that cache management process 10 notices that application 140 is sequentially verifying database records that are stored on data array 130. Further, assume that cache management process 10 notices that these database records are being retrieved from data array 130 one-thousand records at a time, and that the last batch of database records included database records 9,000-9,999. Accordingly, cache management process 10 may predict that the quantity of data that application 140 may next request is database records 10,000-10,999 (e.g., predicted data 144).

Accordingly, cache management process 10 may store 202 predicted data 144 (e.g., database records 10,000-10,999) within a backend cache system (e.g., second cache system 128) included within data array 130 coupled to the host (e.g., server computer/controller 100). As discussed above, data array 130 may include a plurality of electro-mechanical storage devices (e.g., non-volatile, electro-mechanical memory system 112). Accordingly, cache management process 10 may first retrieve 204 predicted data 144 (e.g., database records 10,000-10,999) from the plurality of electro-mechanical storage devices (e.g., non-volatile, electro-mechanical memory system 112) and then store 202 the same within second cache system 128.

To further enhance the performance of the host (e.g., server computer/controller 100), cache management process 10 may provide 206 predicted data 144 (e.g., database records 10,000-10,999) to the host (e.g., server computer/controller 100), which may be stored 208 within a frontend cache system (e.g., first cache system 126) included within the host (e.g., server computer/controller 100). Accordingly, in the event that prediction 142 proves to be accurate and application 140 does indeed need/request predicted data 144 (e.g., database records 10,000-10,999), such data will already be present within first cache system 126 and will not need to be obtained from data array 130.

As discussed above, examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112. Unfortunately, such electro-mechanical hard disk drives may suffer electrical, mechanical, or electro-mechanical failures.

Fortunately and as discussed above, processing logic 124 may calculate and store coded data on coded target 110 (included within non-volatile, electromechanical memory system 112) that may allow for the regeneration of data lost/corrupted on one or more of storage targets 102, 104, 106, 108 (e.g. due to the failure of an electro-mechanical hard disk drive).

Unfortunately, in the event of such a hard disk drive failure, the regeneration of data that is lost/corrupted is a computationally expensive task that may take multiple days to complete. Accordingly, in the event that a hard disk drive is failing, it is desirable to back up the data included within the failing hard disk drive prior to such failure.

Figure 4:
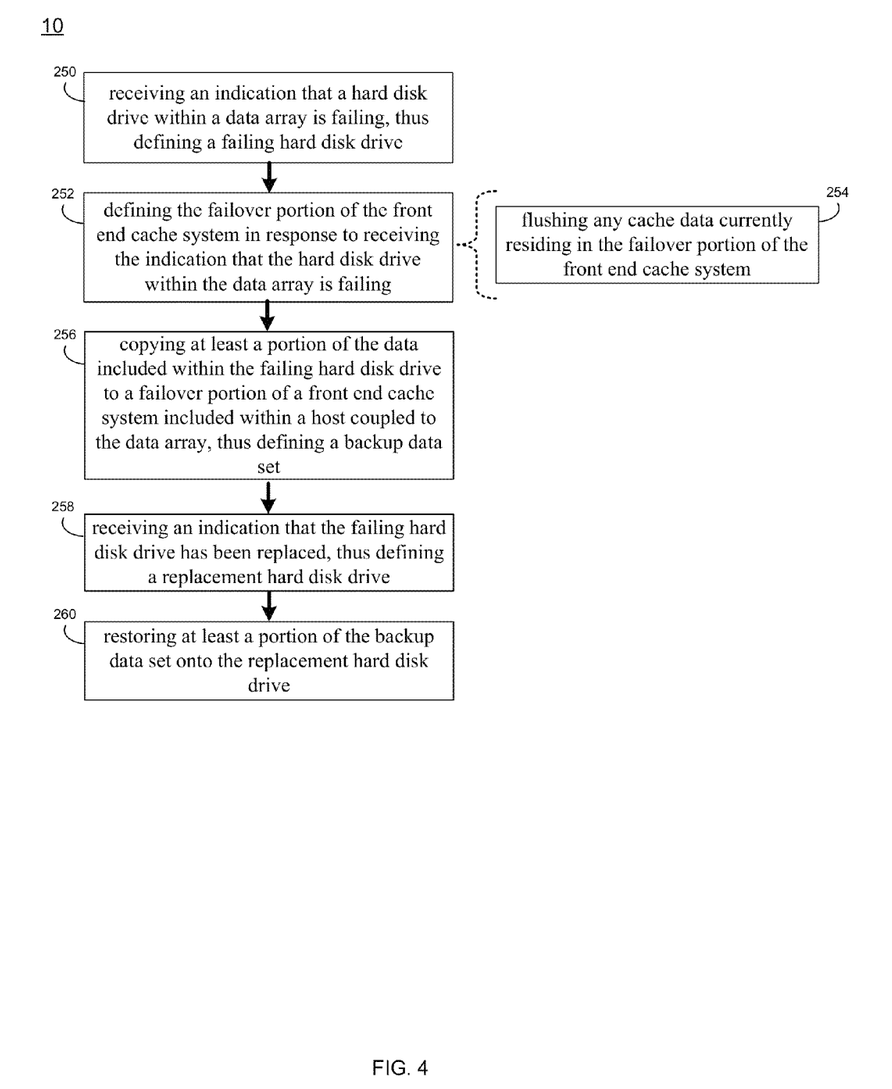
FIG. 4 is a flow chart of another implementation of the cache management process of FIG. 1.

Accordingly and referring also to FIG. 4, cache management process 10 may be configured to receive 250 an indication (e.g. indication 146) that a hard disk drive (e.g. storage target 106) within a data array (e.g. data array 130) is failing, thus defining a failing hard disk drive. Specifically, the failing hard disk drive (e.g. storage target 106) may be configured to provide some form of indication that the same is failing. Additionally/alternatively, cache management process 10 may be configured to monitor the performance of the various hard disk drives included within disk array 130 to identify hard disk drives that appear to be failing.

As discussed above, first cache system 126 may include local IO portion 132, local drive portion 134, data array cache portion 136, and data array failover portion 138. Data array failover portion 138 may be created only upon indication 146 being received 250 by cache management process 10. Accordingly and absent such an indication, data array failover portion 138 may not exist and the area of first cache system 126 that would have been utilized by data array failover portion 138 may be utilized by one of the other above-described portions (e.g. local IO portion 132, local drive portion 134) of first cache system 126.

Accordingly and upon receiving 250 indication 146 that storage target 106 is failing, cache management process 10 may define 252 a failover portion (e.g. data array failover portion 138) of the front end cache system (e.g. first cache system 126) in response to receiving indication 146 that the hard disk drive (e.g. storage target 106) within data array 130 is failing. When defining 252 data array failover portion 138, cache management process 10 may flush 254 any cache data that was currently residing within data array failover portion 138 of first cache system 126. Specifically, the failure of a hard disk drive within data array 130 (and the potential for data loss) is of paramount importance. Accordingly, when cache management process 10 requests a portion of first cache system 126 for use as data array failover portion 138 in response to receiving 250 indication 146 that e.g. storage target 106 within data array 130 is failing, such a request may take precedent over e.g. using such space within first cache system 126 for data caching purposes. Further, since first cache system 126 is configured as a write-through cache, any data received by first cache system 126 in response to a write request is immediately written to data array 130. Accordingly, flushing 254 cache data that is currently residing within the portion of first cache system 126 that will be used for data array failover portion 138 should not result in any data loss.

Once data array failover portion 138 is defined, cache management process 10 may copy 256 at least a portion of the data included within the failing hard disk drive (e.g. storage target 106) to data array failover portion 138 of first cache system 126 included within the host (e.g., server computer/controller 100) coupled to data array 130, thus defining backup data set 148.

The data included within the failing hard disk drive (e.g. storage target 106) may vary depending upon the manner in which data array 130 is configured. For example, the entirety of storage target 106 may be configured as a single LUN (logical unit number), which is essentially a logical drive that is accessible by one or more applications running on e.g., server computer/controller 100. Alternatively, only a portion of storage target 106 may be configured as a single LUN, wherein other portions of storage target 106 are configured as other LUNs. Further still, the entirety of storage target 106 may be configured as a portion of a single LUN, wherein other storage targets are utilized to define other portions of that LUN. Accordingly, when copying 256 at least a portion of the data included within storage target 106 to data array failover portion 138, one or more complete or partial LUNs may be copied to data array failover portion 130.

Assume for illustrative purposes that the failing hard disk drive (e.g. storage target 106) is subsequently replaced with a "healthy" hard disk drive. Accordingly, the "healthy" hard disk drive may be configured to provide a signal indicating that storage target 106 is no longer failing. Alternatively, cache management system 10 may be configured to monitor storage target 106 for any indications of failure and, upon no longer receiving such indications, may deem storage target 106 "healthy".

Accordingly, upon cache management process 10 receiving 258 an indication (not shown) that the failing hard disk drive (e.g. storage target 106) has been replaced (thus defining a replacement hard disk drive), cache management process 10 may restore 260 at least a portion of backup data set 148 onto the replacement hard disk drive (e.g. the "healthy" hard disk drive that replaced failing storage target 106).

Accordingly, by restoring 260 at least a portion of backup dataset 148 onto the replacement hard disk drive, the computationally-expensive process of regenerating data that was stored on failing storage target 106 may be avoided.

As discussed above, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced. Unfortunately, even the largest cache system will eventually fill up with cached data and cold data (e.g. data within the cache system that was not accessed for a considerable amount of time) may need to be overwritten.

As discussed above, second cache system 128 is the cache system for all of data array 130. Since data array 130 may be accessed by many hosts (e.g., server computer/controller 100), second cache system 128 may become filled with cached data quite quickly. Accordingly, second cache system 128 may be configured in a least-recently-used fashion, so that data that has grown cold (has not been accessed for a considerable amount of time) may be flushed from second cache system 128.

For example, second cache system 128 may be divided into a plurality of cache slots. An example of such a cache slot may be a 64 kb portion of second cache system 128. Accordingly and in such an implementation, each gigabyte of second cache system 128 may be divided in 16,384 64 kb cache slots. Each of these cache slots may be utilized to cache data for a single host (e.g., 64 kb of data cached for a single host), for a plurality of hosts (e.g., 16 kb of data cached for each of four hosts), or a plurality of cache slots may be utilized to cache data for one host (e.g., four 64 kb slots cache 256 kb of data for a single host).

As second cache system 128 has a finite size and, therefore, a finite number of cache slots, the more that second cache system 128 is used, the faster the cache slots within second cache system 128 may be filled and, therefore, the quicker the data within a slot may be deemed to have grown cold. Accordingly, once all of the cache slots within second cache system 128 are filled with cached data, the cache slot that contains the coldest cached data (e.g., the cached data that hasn't been used in the longest period of time) will be overwritten with new "hot" data to be cached.

Figure 5:
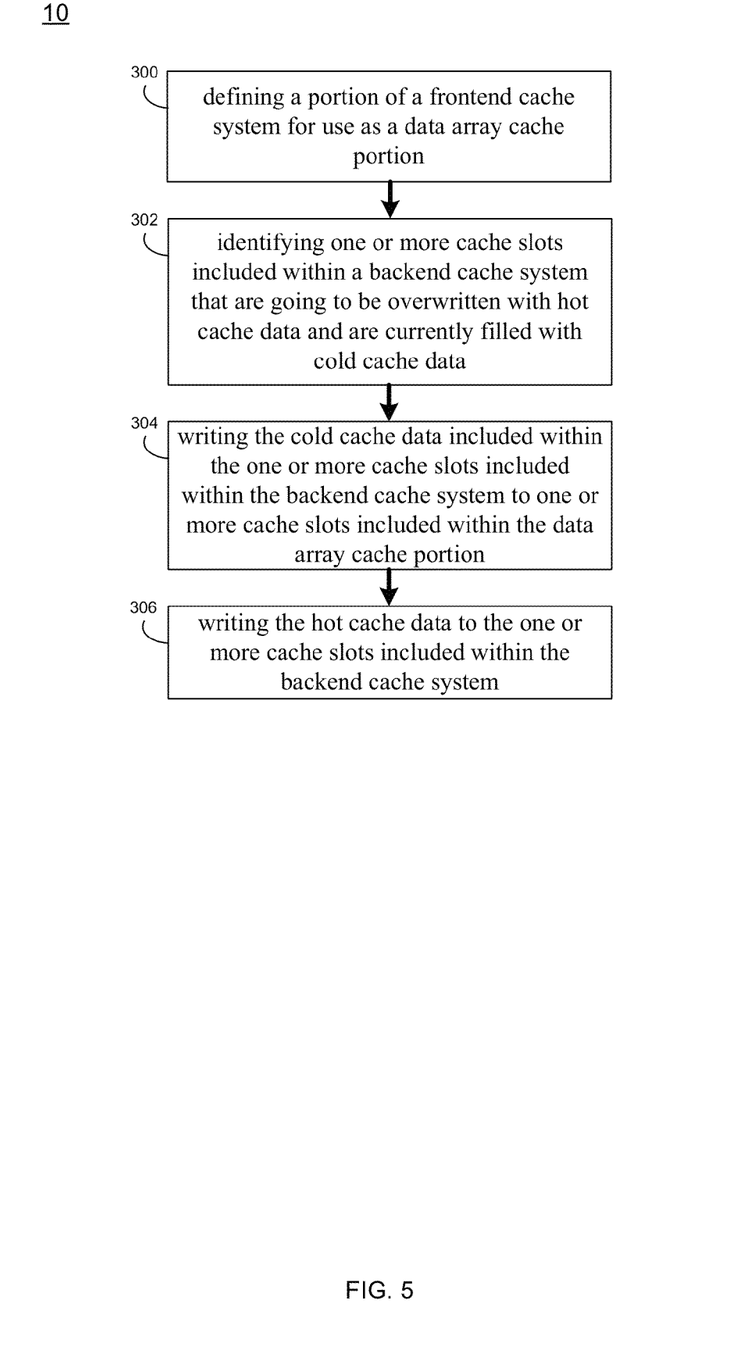
FIG. 5 is a flow chart of another implementation of the cache management process of FIG. 1.

Referring also to FIG. 5, instead of simply overwriting the coldest cached data, cache management process 10 may be configured to store this cold cached data within a portion of first cache system 126. Specifically, cache management process 10 may define 300 a portion of a frontend cache system (e.g., first cache system 126) for use as data array cache portion 136. Data array cache portion 136 may be configured to stored such cold cached data before the data is overwritten with new data to be cached.

For example, cache management process 10 may identify 302 one or more cache slots included within a backend cache system (e.g., second cache system 128) that are going to be overwritten with hot cache data and are currently filled with cold cache data. Assume that second cache system 128 is filled and 640 kb of hot cache data just came in that needs to be stored within second cache system 128. Accordingly and in the implementation in which a cache slot is 64 kb in size, the ten cache slots (e.g., cache slots 150) that contain the coldest cached data will be identified 302 by cache management process 10.

Cache management process 10 may copy the coldest cached data (e.g., cold data 152) and write 304 cold data 152 included within cache slots 150 of the backend cache system (e.g., second cache system 128) to e.g., ten cache slots 154 included within data array cache portion 136.

Once cold data 152 is written to cache slots 154 of data array cache portion 136, cache management process 10 may write 306 hot cache data (e.g., hot data 156) to cache slots 150 included within the backend cache system (e.g., second cache system 128).

In a fashion similar to second cache system 128, the front end cache system (e.g., first cache system 126) may be configured in a least-recently-used fashion, so that data that has grown cold (has not been accessed in a considerable amount of time) may be flushed from first cache system 126.

General:

As will be appreciated by skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD- ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
 receiving an indication that a hard disk drive within a data array is failing, thus defining a failing hard disk drive; and
 copying at least a portion of the data included within the failing hard disk drive to a failover portion of a front end cache system included within a host coupled to the data array, thus defining a backup data set.

2. The computer-implemented method of claim 1 further comprising:
 defining the failover portion of the front end cache system in response to receiving the indication that the hard disk drive within the data array is failing.

3. The computer-implemented method of claim 2 wherein defining the failover portion of the front end cache system includes:
  flushing any cache data currently residing in the failover portion of the front end cache system.

4. The computer-implemented method of claim 1 wherein the front end cache system is a flash-based front end cache system.

5. The computer-implemented method of claim 1 wherein the at least a portion of the data included within the failing hard disk drive includes at least a portion of one or more LUNs.

6. The computer-implemented method of claim 1 further comprising:
  receiving an indication that the failing hard disk drive has been replaced, thus defining a replacement hard disk drive.

7. The computer-implemented method of claim 6 further comprising:
  restoring at least a portion of the backup data set onto the replacement hard disk drive.

8. A computer program product residing on a non-transitory computer readable medium having a plurality of instructions stored thereon which, when executed by a processor, cause the processor to perform operations comprising:
  receiving an indication that a hard disk drive within a data array is failing, thus defining a failing hard disk drive; and
  copying at least a portion of the data included within the failing hard disk drive to a failover portion of a front end cache system included within a host coupled to the data array, thus defining a backup data set.

9. The computer program product of claim 8 further comprising instructions for:
  defining the failover portion of the front end cache system in response to receiving the indication that the hard disk drive within the data array is failing.

10. The computer program product of claim 9 wherein the instructions for defining the failover portion of the front end cache system include instructions for:
  flushing any cache data currently residing in the failover portion of the front end cache system.

11. The computer program product of claim 8 wherein the front end cache system is a flash-based front end cache system.

12. The computer program product of claim 8 wherein the at least a portion of the data included within the failing hard disk drive includes at least a portion of one or more LUNs.

13. The computer program product of claim 8 further comprising instructions for:
  receiving an indication that the failing hard disk drive has been replaced, thus defining a replacement hard disk drive.

14. The computer program product of claim 13 further comprising instructions for:
  restoring at least a portion of the backup data set onto the replacement hard disk drive.

15. A computing system including at least one hardware processor and at least one memory architecture coupled with the at least one hardware processor, wherein the computing system is configured to perform operations comprising:
  receiving an indication that a hard disk drive within a data array is failing, thus defining a failing hard disk drive; and
  copying at least a portion of the data included within the failing hard disk drive to a failover portion of a front end cache system included within a host coupled to the data array, thus defining a backup data set.

16. The computing system of claim 15 further configured to perform operations comprising:
  defining the failover portion of the front end cache system in response to receiving the indication that the hard disk drive within the data array is failing.

17. The computing system of claim 16 wherein defining the failover portion of the front end cache system includes:
  flushing any cache data currently residing in the failover portion of the front end cache system.

18. The computing system of claim 15 wherein the front end cache system is a flash-based front end cache system.

19. The computing system of claim 15 wherein the at least a portion of the data included within the failing hard disk drive includes at least a portion of one or more LUNs.

20. The computing system of claim 15 further configured to perform operations comprising:
  receiving an indication that the failing hard disk drive has been replaced, thus defining a replacement hard disk drive.

21. The computing system of claim 20 further configured to perform operations comprising:
  restoring at least a portion of the backup data set onto the replacement hard disk drive.

\* \* \* \* \*